(12) United States Patent
Broyles et al.

(10) Patent No.: US 11,568,284 B2
(45) Date of Patent: Jan. 31, 2023

(54) SYSTEM AND METHOD FOR DETERMINING A STRUCTURED REPRESENTATION OF A FORM DOCUMENT UTILIZING MULTIPLE MACHINE LEARNING MODELS

(71) Applicant: Intuit Inc., Mountain View, CA (US)

(72) Inventors: Stephanie Broyles, Plano, TX (US); Andrew Van Cao, Plano, TX (US); Stephen A. Eubanks, Plano, TX (US); William R. Georgen, Plano, TX (US); Karpaga Ganesh Patchirajan, Plano, TX (US)

(73) Assignee: Intuit Inc., Mountain View, CA (US)

( * ) Notice: Subject to any disclaimer, the term of this patent is extended or adjusted under 35 U.S.C. 154(b) by 292 days.

(21) Appl. No.: 16/914,218

(22) Filed: Jun. 26, 2020

(65) Prior Publication Data

US 2021/0406716 A1  Dec. 30, 2021

(51) Int. Cl.
  *G06N 5/04*   (2006.01)
  *G06F 16/23*  (2019.01)
  *G06N 20/00*  (2019.01)

(52) U.S. Cl.
  CPC .......... *G06N 5/04* (2013.01); *G06F 16/2379* (2019.01); *G06N 20/00* (2019.01)

(58) Field of Classification Search
  CPC ...... G06F 40/174; G06F 40/279; G06F 16/93; G06F 16/285; G06F 16/35; G06T 7/11; G06T 2207/30176; G06N 7/005; G06N 5/006; G06N 5/02; G06N 5/041; G06N 3/0445; G06N 3/08; G06N 5/046; G06N 3/0481; G06N 3/0454; G06N 20/00; G06N 5/04; G06Q 40/123; G06Q 40/10; G06Q 50/18
  See application file for complete search history.

(56) References Cited

U.S. PATENT DOCUMENTS 7,149,347 B1 * 12/2006 Wnek .................... G06V 10/22
  382/209
9,959,577 B1 *  5/2018 Mori .................... G06Q 40/123
10,713,597 B2   7/2020 Copper
  (Continued)

FOREIGN PATENT DOCUMENTS

CN        108897874       11/2018
WO    WO 2019/023412       1/2019
WO    WO 2021/060899       4/2021

OTHER PUBLICATIONS

Rimchala, Joy, Building a Financial Document Understanding Platform Intuit Engineering, Nov. 14, 2019 (Year: 2019).*

(Continued)

*Primary Examiner* — Scott L Jarrett
(74) *Attorney, Agent, or Firm* — DLA Piper LLP (US)

(57) ABSTRACT

Systems and methods may be used to generate and use a structured form representation and structured metadata. The structured form representation and structured metadata may include information relevant to a particular context and may be used to update document templates, import new documents and update document versions into software, automate data entry for document completion, update records to include new and or updated information, and provide other functionality of an information service.

18 Claims, 9 Drawing Sheets

(56) References Cited

U.S. PATENT DOCUMENTS

| | | | |
|---|---|---|---|
| 10,867,171 B1* | 12/2020 | Contryman | G06V 30/413 |
| 11,120,899 B1* | 9/2021 | Rai | G06F 40/295 |
| 2003/0225749 A1* | 12/2003 | Cox | G06F 16/35 |
| 2004/0181749 A1* | 9/2004 | Chellapilla | G06V 10/22 |
| | | | 715/222 |
| 2007/0033118 A1* | 2/2007 | Hopkinson | G06F 40/174 |
| | | | 382/181 |
| 2012/0330978 A1* | 12/2012 | Yih | G06F 16/3346 |
| | | | 707/E17.058 |
| 2015/0278593 A1* | 10/2015 | Panferov | G06K 9/6255 |
| | | | 382/182 |
| 2015/0310004 A1* | 10/2015 | Morimoto | G06F 16/35 |
| | | | 707/739 |
| 2016/0239487 A1 | 8/2016 | Potharaju | |
| 2017/0300565 A1 | 10/2017 | Calapodescu | |
| 2018/0018311 A1* | 1/2018 | Mukherjee | G06F 40/174 |
| 2018/0018676 A1* | 1/2018 | Mukherjee | G06Q 10/10 |
| 2018/0018740 A1* | 1/2018 | Unsal | G06N 20/00 |
| 2018/0144042 A1* | 5/2018 | Sheng | G06Q 10/10 |
| 2018/0203836 A1 | 7/2018 | Singh | |
| 2018/0253209 A1 | 9/2018 | Jaygarl | |
| 2018/0300295 A1* | 10/2018 | Maksak | G06N 3/04 |
| 2018/0300315 A1* | 10/2018 | Leal | G06F 16/355 |
| 2019/0065911 A1 | 2/2019 | Lee | |
| 2019/0087455 A1* | 3/2019 | He | G06F 40/35 |
| 2019/0155894 A1* | 5/2019 | Gandhi | G06F 40/106 |
| 2019/0197109 A1 | 6/2019 | Peters | |
| 2019/0205636 A1 | 7/2019 | Saraswat | |
| 2020/0042645 A1* | 2/2020 | Douthit | G06F 16/93 |
| 2020/0097717 A1* | 3/2020 | Young | G06F 40/106 |
| 2020/0104587 A1 | 4/2020 | Bhatnagar | |
| 2020/0184423 A1 | 6/2020 | McEnroe | |
| 2020/0257963 A1 | 8/2020 | Abhinav | |
| 2020/0356723 A1* | 11/2020 | Fume | G06N 3/0454 |
| 2021/0012102 A1 | 1/2021 | Cristescu | |
| 2021/0073216 A1* | 3/2021 | Chang | G06F 16/24573 |
| 2021/0082062 A1* | 3/2021 | Hurd | G06Q 40/123 |
| 2021/0150338 A1* | 5/2021 | Semenov | G06N 3/0472 |
| 2021/0157809 A1 | 5/2021 | Mor | |
| 2021/0201014 A1 | 7/2021 | Wu | |
| 2021/0271805 A1* | 9/2021 | Comeau | G06F 40/154 |
| 2021/0342723 A1* | 11/2021 | Rao | G06N 20/00 |
| 2021/0366099 A1* | 11/2021 | Liao | G06F 40/177 |
| 2021/0374395 A1* | 12/2021 | Tata | G06V 10/23 |
| 2021/0383067 A1* | 12/2021 | Reisswig | G06F 16/367 |
| 2021/0397634 A1* | 12/2021 | Gerber, Jr. | G06F 16/353 |
| 2022/0129671 A1* | 4/2022 | Klaiman | G06N 3/0454 |

OTHER PUBLICATIONS

Automate document processing with AI—Extract structured data from documents with speed, flexibility, and accuracy using Amazon Texttract, Amazon Web Services, 2019 (Year: 2019).*
Wnek, Janusz, Machine Learning of Generalized Document Templates for Data Extraction DAS2002, LNCS2433, 2002 (Year: 2002).*
Mahbubur, Muhammad et al., Unfolding the Structure of a Document using Deep Learning University of Maryland, 2019 (Year: 2019).*
Imran, Kashif et al., Automatically extract text and structured data from documents with Amazon Textract AWS Machine Learning Blog, May 30, 2019 (Year: 2019).*
International Search Report issued in PCT/US2019/043778 dated Oct. 31, 2019.
Written Opinion issued in PCT/US2019/043778 dated Oct. 31, 2019.
J. Baek, "Fast Document Rectification and Enhancement", Dropbox, Aug. 16, 2016, 11 pages.
C. Dong et al., "Character-Based LSTM-CRF with Radical-Level Features for Chinese Named Entity Recognition", NLPCC-ICCPOL, 2016, pp. 239-250.
Z. Huang et al., "Bidirectional LSTM-CRF Models for Sequence Tagging", arXiv:1508.01991v1, Aug. 9, 2015, 10 pages.
D. Kingma et al., "ADAM: A Methodfor Stochastic Optimization", arXiv:1412.6980v9, Jan. 30, 2017, 15 pages.
B. Lin et al., "Multi-Channel BiLSTM-CRF Model for Emerging Named Entity Recognition in Social Media", Proceedings of the 3rd Annual Workshop on Noisy User-Generated Text, Sep. 7, 2017, pp. 160-165.
A. Newell et al., "Stacked Hourglass Networks for Human Pose Estimation", arXiv:1603.06937v2, Jul. 26, 2016, 17 pages.
Y. Pai et al., "Adaptive Thresholding Algoritm: Efficient Computation Technique Based on Intelligent Block Detection for Degraded Document Images", Pattern Recognition, vol. 43, Issue 9, Sep. 10, 2010, pp. 3177-3187.
Sauvola et al., "Adaptive Document Image Binarization", Patter Recognition vol. 33, (2000), pp. 225-236.
Y. Xiong, "Fast and Accurate Document Detection for Scanning", Dropbox, Aug. 9, 2016, 9 pages.
Suzuki, "Topological Structural Analysis of Digitized Binary Images by Border Following", Computer Vision, Graphics, and Image Processing, vol. 30, pp. 32-46, 1985.
International Search Report dated Oct. 7, 2020 issued in PCT/US2020/040398.
Written Opinion dated Oct. 7, 2020 issued in PCT/US2020/040398.
Strickland et al. "BERT and PALS: Projected Attention Layers for Efficient Adaptation in Multi-Task Learning", Cornell University Library, Feb. 7, 2019, 11 pages.
Houlsby et al., "Parameter-Efficient Transfer Learning for NLP", arXiv:1902.00751v2 [cs.LG], Jun. 13, 2019, 13 pages.
Search Report dated Jun. 28, 2022 issued in International Application No. PCT/US2022/021703.
Written Opinion dated Jun. 28, 2022 issued in International Application No. PCT/US2022/021703.
Liu et al., "Multi-Task Deep Neural Networks for Natural Language Understanding", arXiv:1901.11504v2 [cs.CL], May 30, 2019, 10 pages.
Sanh et al., "DistilBERT, a distilled version of BERT: smaller, faster, cheaper and lighter", arXiv:1910.01108v4 [cs.CL], Mar. 1, 2020, 5 pages.
Sun et al., "MobileBERT: a Compact Task-Agnostic BERT for Resource-Limited Devices", arXiv:2004.02984v2 [cs.CL], Apr. 14, 2020, 13 pages.
"Bert-Extractive-Summarizer—PyPi", https://pypi.org/project/bert-extractive-summarizer/, Feb. 17, 2022, 11 pages.
Mozafari et al., "BAS: An Answer Selection Method Using BERT Language Model", arxiv.org/pdf/1911.01528, 2019, 28 pages.
Kratzwald et al. "RankQA: Neural Question Answering with Answer Re-Ranking", arXiv:1906.03008, 2019, 10 pages.
U.S. Appl. No. 17/246,277, filed Apr. 30, 2021.
U.S. Appl. No. 16/265,505, filed Feb. 1, 2019.
U.S. Appl. No. 16/556,797, filed Aug. 30, 2019.
U.S. Appl. No. 16/732,869, filed Jan. 2, 2020.
U.S. Appl. No. 17/662,638, filed May 9, 2022.

* cited by examiner

SYSTEM AND METHOD FOR DETERMINING A STRUCTURED REPRESENTATION OF A FORM DOCUMENT UTILIZING MULTIPLE MACHINE LEARNING MODELS

BACKGROUND

Software applications may process a variety of digital forms, for example, compliance forms designed to comply with government regulations. To facilitate more efficient and accurate form completion and use data included in the forms, it would be advantageous to provide a capability to automatically generate a structured, machine-readable representation of forms and other documents. For example, generating a document representation that includes a structured file using the Portable Document Format (PDF). This capability would streamline adapting software processes for completing forms to handle new documents and updated form versions.

It would also be desirable to provide a capability to generate a structured, machine-readable representation of form metadata (i.e., the values input into a digital form). A structured representation of form metadata would enable information collected by a form to be rapidly transferred to a new document and modified over time to keep the information up to date. Additionally, rule-based approaches to document processing are not scalable since rule-based approaches typically require adaptation of the rules when applied to new or different contexts. Therefore, a new approach is needed to provide document processing capabilities that are extensible to a wide variety of forms and form metadata.

BRIEF DESCRIPTION OF THE FIGURES

FIG. 4A illustrates an exemplary form that may be processed by the disclosure described herein according to an embodiment of the present disclosure.

FIG. 5A illustrates an exemplary reference document that may be processed by the disclosure described herein according to an embodiment of the present disclosure.

DETAILED DESCRIPTION OF SEVERAL EMBODIMENTS

Embodiments described herein may generate structured data (e.g., a structured representation of a form and structured metadata) to facilitate document processing operations. For example, techniques described herein may generate a structured representation of a form that can be read by a software application. Components of the structured form representation may be classified to determine the portions of the form that are relevant to a particular context (e.g., completing an income tax return, filling out patient intake forms, and the like). Techniques described herein may also generate a structured representation of form metadata including text and numerical values input into the form fields. The structured metadata may be transferred to other types of forms to efficiently complete digital forms. The structured metadata may also be added to a record for a person, business, and or other entity as updates to existing information.

The approaches for generating structured data described herein are rapidly scalable to different forms (e.g., W-2s, loan applications, medical history questionnaires, and the like) and documents (e.g., driver's licenses, property deeds, bank statements, and the like). Optical character recognition (OCR) and other existing methods for document processing rely on position data (e.g., X and Y coordinates of the source document) and rules based approaches to detect and extract relevant information from forms. The techniques described herein improve the scalability and accuracy of automated document processing techniques by deriving word embeddings, context, and other features from attributes describing forms and form metadata. Machine learning models are then trained to recognize the features in documents included in training data. The machine learning models may use the features to classify and extract data from forms.

The flexible, unstructured machine learning approach described herein can be used to interpret a wide variety of forms without extensive re-programing of coordinate based logic to adjust for changes in the position of fields and other form components. The approaches described herein may also recognize and extract newly added content from new and or updated forms without manual re-programming. Relative to rules based techniques, the machine learning approach leverages a greater number of model features and a multitude of different ways of combining these features to improve the accuracy of data extraction and classification operations. Programing a rules based system that incorporates a similar number of features and feature combinations is not practical due to the excessive amount of time, cost, and computational resources required. Additionally, many of the combinations of features used by the machine learning models to make accurate predictions about how to extract and classify information included in forms are not intuitive and would be impossible for a human programmer or subject matter expert to recognize.

Figure 1:
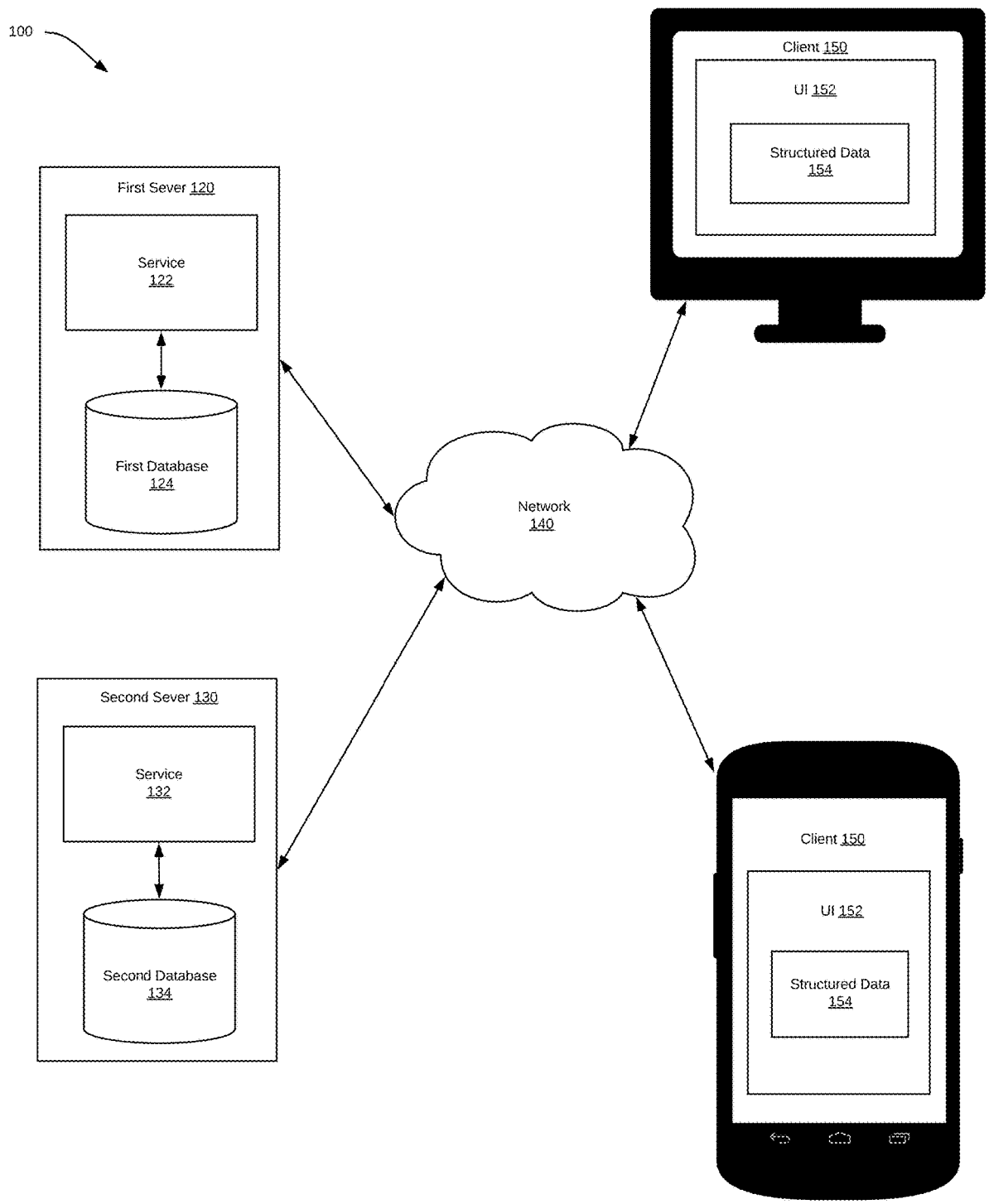
FIG. 1 shows an exemplary system configured to generate and manipulate structured data in accordance with an embodiment of the present disclosure.

FIG. 1 shows an example of a system 100 configured to implement a process for generating structured data 154 in accordance with the disclosed principles and as described in U.S. application Ser. No. 16/569,297, filed Sep. 12, 2019, entitled "Generating Structured Representations of Forms Using Machine Learning", the contents of which are incorporated by reference as though set forth herein in full. Structured data may include a schema format or other structured representation of a form and or metadata input into a form. The structured data 154 may be machine readable and consumed by an information service, data processing application, or other piece of software. The system 100 may include a first server 120, second server 130, and or one or more client devices 150. First server 120, second server 130, and or client device(s) 150 may be configured to communicate with one another through network 140. For example, communication between the elements may be facilitated by one or more application programming interfaces (APIs). APIs of system 100 may be proprietary and/or may be examples available to those of ordinary skill in the art such as Amazon® Web Services (AWS) APIs or the like. Network 140 may be the Internet and/or other public or private networks or combinations thereof.

First server 120 may be configured to implement a first service 122, which in one embodiment may be used to input forms and other documents via the network 140 from one or more databases 124, 134, the second server 130 and or client device(s) 150. The first server 120 may execute processes that determine the information in a form that is relevant to a particular context and generate structured data 154. The first server 120 may determine the relevant information and or generate structured data 154 using one or more machine learning models. The machine learning models may be stored in database 124, database 134, and or received from second server 130 and or client device(s) 150. The structured data 154 may include a structured form representation that includes the lines, images, input fields and other form components and or structured metadata that includes the data input into the fields of the form. For example, the structured metadata may include the amounts, values, marks, or other data entered in the fields, a description of the data collected by the fields, the location of the fields within the form, and a category describing the type of data collected by the field (e.g., name, address, taxable income, credit score, previous medical condition, and the like).

First service 122 or second service 132 may implement an information service, which may maintain a library of forms and or data concerning people, businesses, and other entities. The information service may be any network 140 accessible service that maintains financial data, medical data, personal identification data, and or other data types. For example, the information service may include QuickBooks® and its variants by Intuit® of Mountain View Calif. The information service may provide one or more features that use the structured form representations and structured metadata generated by the system 100. For example, components of the forms that are relevant in a particular context may be assembled in the structured form representation. Using the structured form representation relevant metadata input into one or more fields in the form may be extracted and assembled into structured metadata. The structured metadata may be transferred to into a digital form to complete the form and or used to update a record of a person, business, or other entity. The structured form representation may also be input into a software process to update an existing form version of process for collecting metadata from users that is used to complete a form.

Client device(s) 150 may be any device configured to present user interfaces (UIs) 152 and receive inputs. The UIs 152 may be configured to display completed documents, and forms receiving transferred and or structured data 154 output by the first server 120 for review. The UIs 152 may also display blank forms that may be completed by transferring structured metadata into the blank forms. The UIs may also display documents and forms that were previously processed by the system 100. Exemplary client devices 150 may include a smartphone, personal computer, tablet, laptop computer, or other device.

First server 120, second server 130, first database 124, second database 134, and client device(s) 150 are each depicted as single devices for ease of illustration, but those of ordinary skill in the art will appreciate that first server 120, second server 130, first database 124, second database 134, and or client device(s) 150 may be embodied in different forms for different implementations. For example, any or each of first server 120 and second server 130 may include a plurality of servers or one or more of the first database 124 and second database 134. Alternatively, the operations performed by any or each of first server 120 and second server 130 may be performed on fewer (e.g., one or two) servers. In another example, a plurality of client devices 150 may communicate with first server 120 and/or second server 130. A single user may have multiple client devices 150, and/or there may be multiple users each having their own client device(s) 150.

Figure 2:
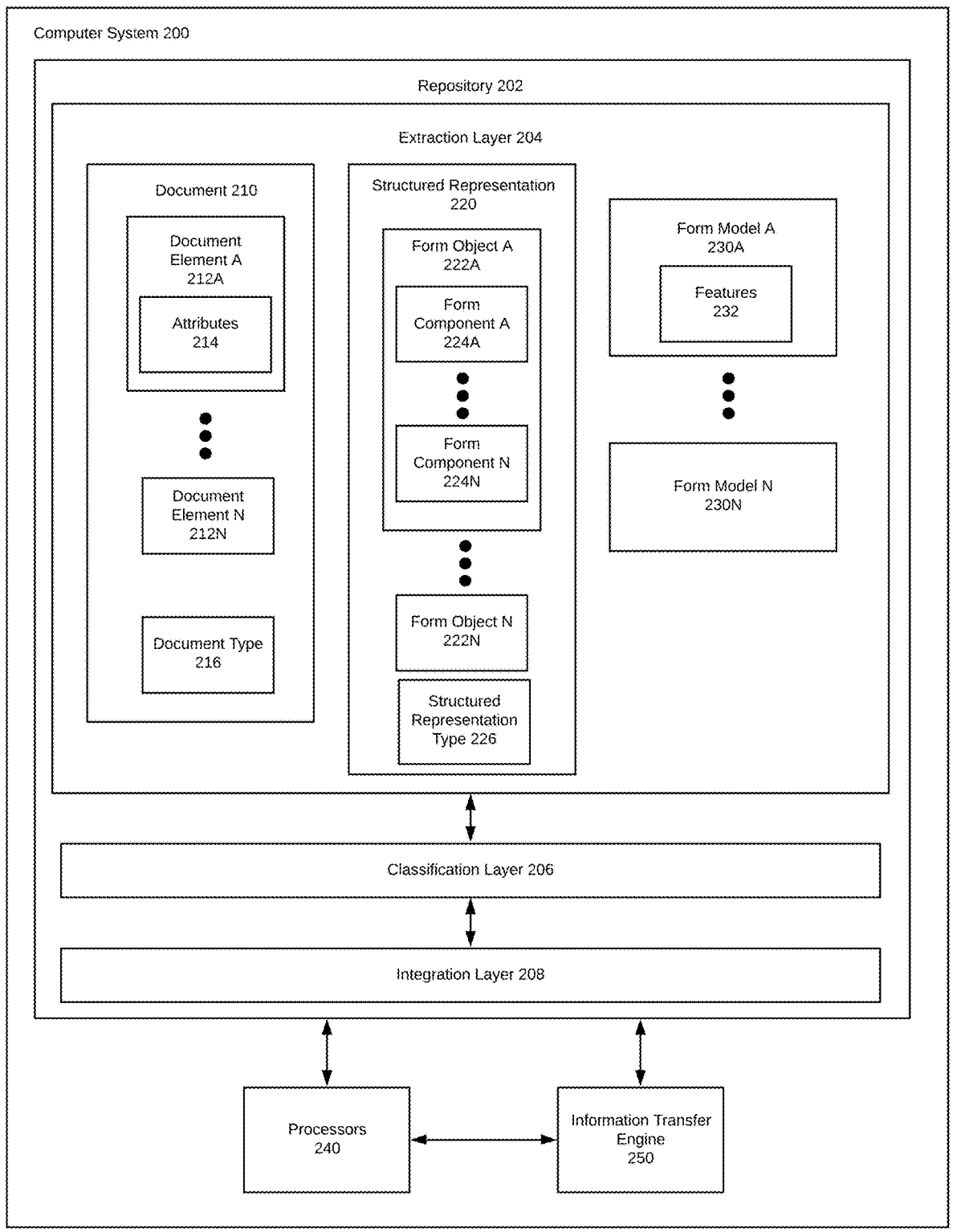
FIG. 2 shows more details of the system of FIG. 1 according to an embodiment of the present disclosure.
Figure 3:
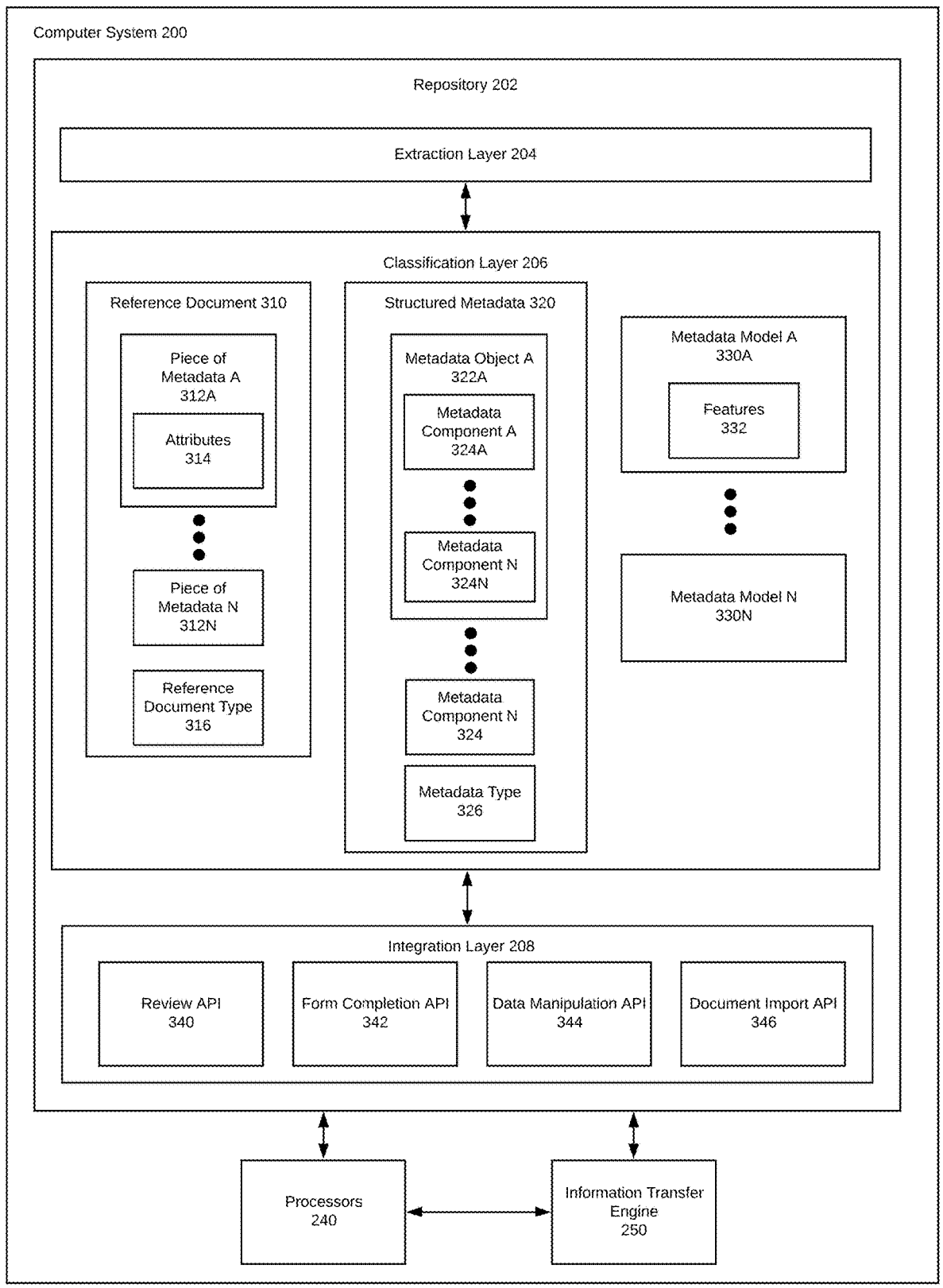
FIG. 3 shows more details of the system of FIG. 1 according to an embodiment of the present disclosure.

FIGS. 2-3 are block diagrams illustrating an example computer system 200 in accordance with one or more embodiments of the invention. As shown in FIG. 2, the computer system 200 includes a repository 202, an information transfer engine 250, and one or more computer processors 240. In one or more embodiments, the computer system 200 takes the form of the computing device 700 described in FIG. 7 and the accompanying description below or takes the form of the client device 150 described in FIG. 1. In one or more embodiments, the computer processor(s) 240 takes the form of the computer processor(s) 702 described in FIG. 7 and the accompanying description below.

In one or more embodiments, the repository 202 may be any type of storage unit and/or device (e.g., a file system, database, collection of tables, or any other storage mechanism) for storing data. Further, the repository 202 may include multiple different storage units and/or devices. The multiple different storage units and/or devices may or may not be of the same type or located at the same physical site. The repository 202 may include an extraction layer 204, classification layer 206, and integration layer 208.

The extraction layer 204 (example features illustrated in FIG. 2) generates a structured form representation 220 that is provided to the classification layer 206 (example features illustrated in FIG. 3). The classification layer 206 uses the structured form representation 220 to locate metadata input into the fields of the form and generates structured metadata 320 that includes the data input into the form that is relevant to a particular context. The integration layer 208 enables the structured form representation 220 and the structured metadata 320 to be reviewed manually for accuracy. The integration layer 208 also transfers the structured metadata 320 output by the classification layer 206 and structured form representation 220 output by the extraction layer 204 to one or more information services for use in information management and or document processing operations.

For example, the extraction layer 204 may generate a structured representation of a W-2 tax form that includes a machine readable schema of the lines, descriptions, input fields, and other form components of the W-2 tax form. The classification layer 206 receives the structured representation of the W-2 tax form from the extraction layer 204 and uses the structured representation of the W-2 tax form to locate metadata input into one or more fields included in the W-2 tax form (e.g., wages and other income input on line 1). The classification layer then classifies the metadata into metadata components that are assembled into structured metadata 320. The extraction layer 204 and or classification layer may determine the relevance of the form components and or metadata components of the W-2 tax form that are important for a particular context (e.g., completing a 1040 income tax return form). Therefore, only the relevant form components and or metadata components for completing the 1040 income tax return form (e.g., social security number, name, address, income, and the like) may be included in the structured form representation 220 and or structured metadata 320.

The structured metadata 320 and or the structured form representation 220 are then provided to the integration layer 208 so they can be reviewed for accuracy and distributed to an information service for use in an information management and or document processing functionality. For example, the structured metadata 320 and structured form representation may be used to complete forms (e.g., the 1040 income tax return), modify a user's record to include updated data extracted from a form (e.g., the W-2 tax form), and or import documents into the information service (e.g., an updated version of the W-2 tax form).

As shown in FIG. 2, the extraction layer may include a document 210, a structured form representation 220, and one or more machine learning models (e.g., form models 230A, . . . , 230N). The document 210 is a file that may be represented using the Portable Document Format (PDF), HyperText Markup Language (HTML), Extensible Markup Language (XML), JavaScript Object Notation (JSON), or any other file format. For example, the document 210 may be a compliance form (e.g., audit form, data security form, tax form, medical form, privacy policy, and the like) to be completed by a user and designed to comply with the regulations of a government agency. The compliance form may be specific to a jurisdiction (e.g., a geographic region such as a state, country, region, municipality, reinvestment zone, and the like). The document 210 may also be any other form to be completed by the user including, for example, a driver's license application, loan application, IQ test, insurance questionnaire, or any other application, test, questionnaire of other form or document.

The document 210 may include document elements 212A, . . . , 212N and a document type 216. The document element 212A may be a component of the document 210. For example, the document element 212A may be a chunk of text (e.g., completion instructions, line description, a question, section heading, and the like). The document element 212A may also be a shape (e.g., a line or rectangle), an image (e.g., a bitmap), a blank portion of the document, or any other non-textual component of the document. For example, a document element 212A may be a blank space, rectangle, or box that represents an input field.

Each document element 212A may include one or more attributes 214 that describe the particular document element 212A. The attributes 214 may be textual attributes such as font, font size, number of characters, number of words, and the like. The number of characters and or number of words may include amounts of different character types and or particular words. For example, the number of characters may include the amount of numeric characters and the amount of alphabetic characters in a particular document element 212A. The attributes 214 may also include geometric attributes indicating the location of the document element 212A within the document 210. The location may be expressed in terms of a region (e.g., a particular rectangular section) in a coordinate system (e.g., Cartesian coordinates within the document 210), where the region encompasses the document element 212A. The locations of particular document elements may be used to calculate distances between the document elements 212A, . . . , 212N. The distances between the document elements 212A, . . . , 212N may be used, for example, to construct the structured form representation 220. The distances between the document elements 212A, . . . , 212N may also be used as features of the form models 230A, . . . , 230N and or other machine learning models to facilitate extracting information form a particular location in the form and or determining whether the extracted information is relevant to a particular context.

The document type 216 may be a category that describes the document 210. For example, the document type 216 may be a general category, such as tax document, payroll document, legal document, and the like. The document type 216 may also be a specific category, such as Schedule 1 of a Federal Tax Form, application for a California Driver's license, and the like. Structured form representations 220 may be organized according to the document type 216 associated with a particular document 210. The document type 216 may also be used as a feature of the form models 230A, . . . , 230N and or other machine learning models to facilitate extracting information from a particular location in the form and or determine whether the extracted information is relevant in a particular context.

Figure 4A:
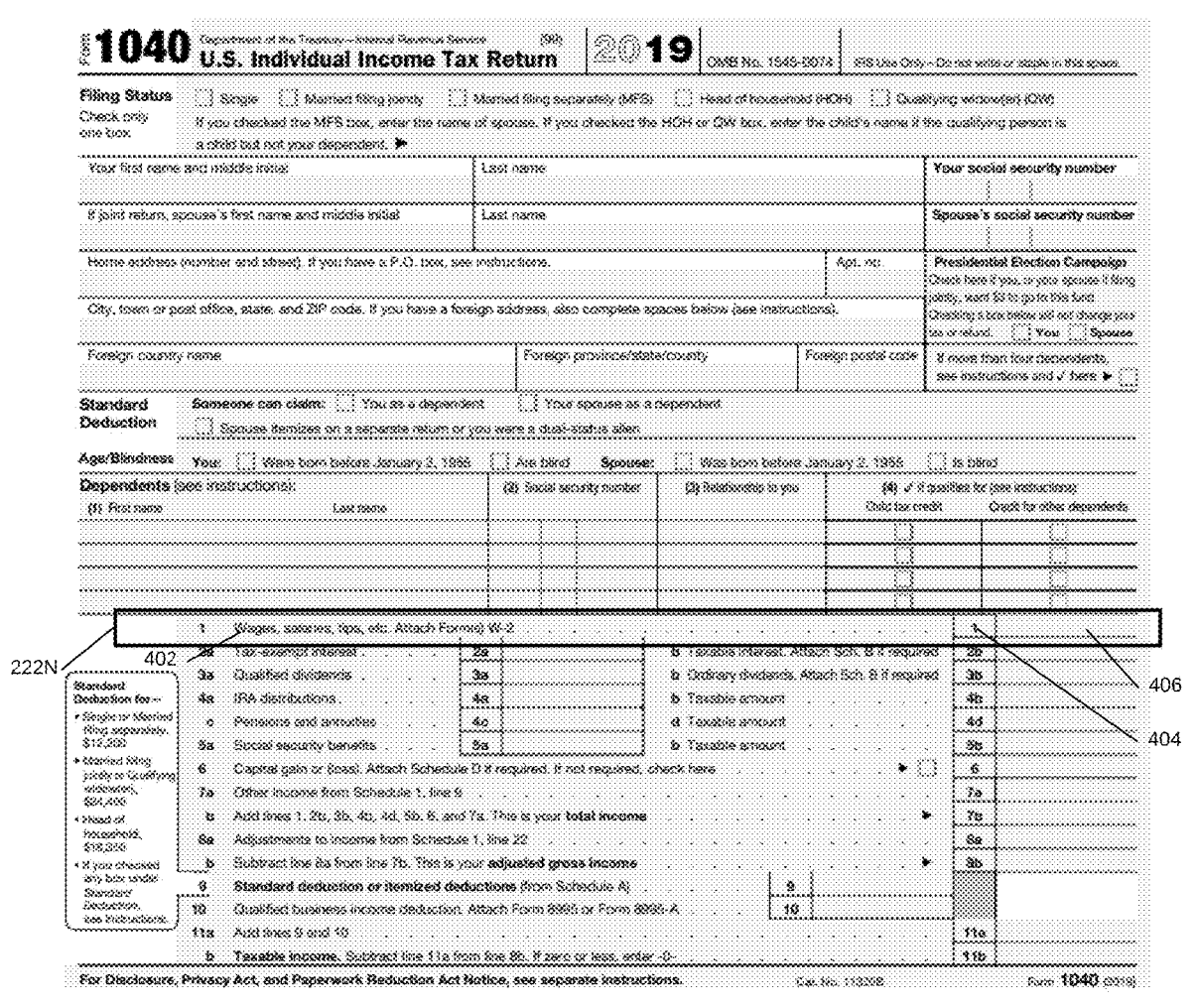
Figure 4B:
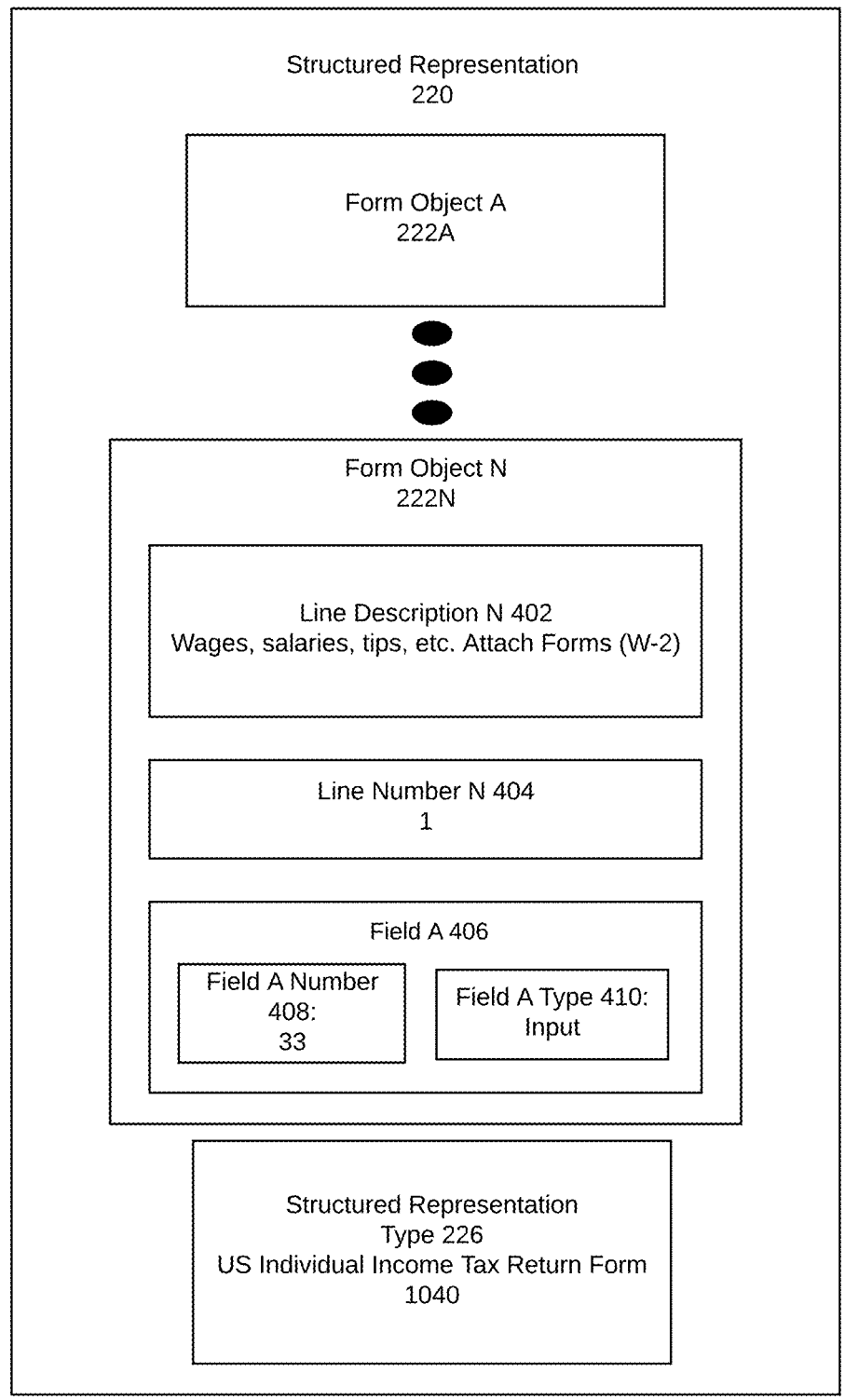
FIG. 4B illustrates an exemplary structured form representation according to an embodiment of the present disclosure.

The structured form representation 220 may be a schema for a form. For example, the schema may be represented using JSON or XML. The structured form representation 220 may include form objects 222A, . . . , 222N and a structured representation type 226. A form object 222A may include one or more form components 224A, . . . , 224N. A form component 224A may correspond to a particular document element in the document 210 and may be any component of the structured form representation 220. The form components 224A, . . . , 224N may be detected using the attributes 214 of the document elements 212A, . . . , 212N and or the document type 216. The form components 224A, . . . , 224N may include line descriptions, line numbers, fields, field numbers, field descriptions, and the like as illustrated in the structured form representation 220 show in in FIG. 4B. A form component 224A may include other form components. For example, as illustrated in FIG. 4B, a field 406 may include a field number 408 indicating the order in which the field 406 appears in the form (i.e., if the form includes 32 fields that are located above, to the left of, or otherwise before field A the field number 408 for field A is 33). Additional form components 224A, . . . , 224N corresponding to the field document element include a field description 402 describing the data that is input into the field 406, a line number 404 indicating the position of the field within the document, and a field type 410 (e.g., input, checkbox, dropdown, etc.) indicating how data was entered into the field 406. The form component 224A may also include form objects 222A, . . . , 222N. For example, a "section" form component or "page" form component may include several of the form objects 222A, . . . , 222N. Each form component 224A may be assigned a value. For example, the value may be a text value, numeric value, check mark, and the like.

The form object 222A may be defined based on a particular location (e.g., a line number or Cartesian coordinates) within the document 210. For example, the form object 222A may correspond to an area within the document 210 that is within a threshold distance of the particular location. The form object 222A may include the form components 224A, . . . , 224N that correspond to the document elements 212A, . . . , 212N that are within the threshold distance of the particular location in the document.

The structured representation type 226 may be a label (e.g., a form category, form length, form intended use, and the like) that describes the structured form representation 220. The structured representation type 226 may correspond to the document type 216 of a document 210. For example, the structured representation type 226 may be a general category, such as tax document, payroll document, or legal document. Alternatively, the structured representation type 226 may be a specific category, such as Schedule 1 of a Federal Tax Form, application for a California Driver's license, and the like. The structured form representations 220 included in the repository 202 may be accessed (i.e., queried) using the structured representation type 226.

The extraction layer 204 may also include one or more machine learning models, for example, one or more form models 230A, . . . , 230N. The form models 230A, . . . , 230N may include supervised models and or unsupervised models with functionality to receive the document elements 212A, . . . , 212N, attributes 214, and document type 216 and determine the form components 224A, . . . , 224N that are relevant to a particular context based on the attributes 214 and or document type 216. For example, in the form 1040 example shown in FIG. 4A, the form models 230A, . . . , 230N may determine that only the form components 224A, . . . , 224N corresponding to the input field and line description document elements 212A, . . . , 212N are relevant to the particular context of preparing an income tax return. The relevance prediction generated by the form models 230A, . . . , 230N may be used to generate a structured form representation 220 that includes only the relevant form components of the form 1040. Therefore, the non-relevant components (e.g., header, footer, instructions embedded in the document) may not be included in the structured form representation 220. In an alternative example where the document 210 is a W-2 tax form, the form models 230A, . . . , 230N may determine that the form components 224A, . . . , 224N corresponding to the document elements 212A, . . . , 212N including input fields for entering personal information (e.g., name, address, social security number, and the like) and wages document elements 212A, . . . , 212N are relevant to the context of preparing a form 1040 income tax return. Based on the relevance predictions, the form components 224A, . . . , 224N corresponding to the W-2 fields for entering personal information and wages may be included in the structured representation 220 and the form components 224A, . . . , 224N corresponding to the other document elements may be excluded.

The form models 230A . . . , 230N may include one or more different machine learning models for determining relevant form components. For example, the form models 230A . . . , 230N may include a line description form model that determines relevant line descriptions, a line number form model that determines relevant line numbers included in a document, a fields form model that determines relevant fields included in a document, a form headers form model that determines relevant form headers included in a document, a parts form model that determines relevant parts included in a document, and a tables form model that determines relevant tables included in a document. Each form model may use a set of features 232 specific to a particular type of form component to make relevance predictions. The set of features 232 for each type of form component may be derived from a training dataset that is particular to the form component of the form model 230A . . . , 230N. For example, the features 232 used by the field form model to determine if the fields included in the document are relevant to a particular context (e.g., filing a tax form, filling out a medical record, and the like) may be generated by executing one or more machine learning algorithms on a fields training dataset including a plurality of documents having fields labeled as relevant to a particular context or not relevant to a particular context. The features 232 generated from the training dataset may include vectors and or other numerical representations of, for example, locations of fields within the document, type of document including the field, the types of data the fields, the content entered into the fields, statistical data of how frequently the field was left blank and or filled in, and other characteristics of fields that are labeled as relevant to one or more use case contexts in the training data.

To generate relevance predictions, the form models 230A, . . . , 230N may compare features 232 derived from the document 210 to the features 232 observed in the training data. The features 232 for the document 210, may include vectors and other numerical representations of the attributes 214, document elements 212A, . . . , 212N, and or the document type 216 of the document. The features 232 for each form model 230A, . . . , 230N may be derived from different portions of the document 210 and different portions the documents included in the training data. The features 232 may include textual features (e.g., word vectors, word embeddings, or other representations of text included in the form and other textual document elements). The features 232 may also include context features generated based on the words surrounding a particular word or phrase included in a particular document element and or the document elements 212A, . . . , 212N surrounding the particular document element. The features 232 may also be derived from the attributes 214 of the document elements 212A, . . . , 212N. For example, the features 232 may be calculated by aggregating or summarizing the attributes 214 of the document elements 212A, . . . , 212N. The features 232 may also be generated by applying statistical measurements to the attributes 214 of the document elements 212A, . . . , 212N. Additionally, the features 232 may represent any distinguishing characteristics corresponding to the attributes 214. Features 232 may also be based on the document type 216.

Once derived from the document 210, the features 232 for the document 210 are received as input data by the form models 230A, . . . , 230N. The form models 230A, . . . , 230N then compare the features 232 of the document 210 to the features 232 observed in the training data. Based on the comparison, the form models 230A, . . . , 230N may generate a relevance prediction. For example, a fully connected layer may receive numerical outputs from one or more hidden layers included in the form models 230A, . . . , 230N as input and output a relevance prediction, for example, a prediction that wages amount field is relevant to the context of preparing an income tax return.

To generate the structured form representation, form components that are relevant to a particular context may be aggregated. To determine relevance the form models 230A, . . . , 230N may generate a relevance prediction based on the features. The form models 230A, . . . , 230N may also use a clustering technique to determine the relevant form components to include in the structured form representation 220. To cluster based on relevance, the more models 230A, . . . , 230N may derive features 232 for the document elements 212A, . . . , 212N using the attributes 214, aspects of the document elements 212A, . . . , 212N (e.g., text included in a document element), and or the document type 216 as described above. A vector representation of the form components 224A, . . . , 224N detected in the document may be calculated based on the features 232 derived for the document elements 212A, . . . , 212N that correspond to the form components 224A, . . . , 224N. The vector representations of the form components 224A, . . . , 224N may be mapped to a feature space. The feature space may be a multidimension space wherein the number of dimensions in the feature space corresponds to the number of features 232 used to calculate the vector representations. One or more convolution operations may also be applied to reduce the dimensionality of the feature space. A distance separating the form components 224A, ..., 224N within the feature space may be calculated. The form components that have a distance that is less than a threshold distance of one or more other form components 224A, ..., 224N, a defined position in the features space, and or a particular form component that is known to be relevant may be determined to be relevant to a particular context and may included in the structured form representation.

Once the structured form representation 220 is generated by the extraction layer 204 according to the relevance predictions made by the form models 230A, ..., 230N, the structured form representation 220 may be provided to the classification layer 206.

The classification layer 206 may receive a reference document 310 and generate a structured representation of the metadata (i.e., structured metadata 320) included in the reference document 310. The reference document 310 may be a partially and or fully completed version of the document 210 included in the extraction layer 204. The reference document 310 may include pieces of metadata 312A, ..., 312N and a metadata type 316. The piece of metadata 312A may include information that is input into the reference document 310. For example, the piece of metadata 312A may include a value (e.g., a string of text or numbers) for a field included in the reference document 310. For example, the text input into a name or address field, a number input into an amount field, and the like. The pieces of metadata 312A, ..., 312N may also include other portions of the reference document 310, for example, images, annotations, and other information included in the reference document 310. Each piece of metadata 312A may include one or more attributes 314 that describe the piece of metadata 312A. The attributes 314 may be textual attributes such as font, font size, handwritten or typed, number of characters, number of words, and the like. The number of characters and or number of words may include amounts of different character types and or particular words. For example, the number of characters may include the amount of numeric characters and the amount of alphabetic characters in a particular piece of metadata 312A. The attributes may also include a category that describes the piece of metadata 312A such as, for example, personal information, numerical values, financial data, medical information, and the like. The attributes 314 may also include geometric attributes indicating the location of the piece of metadata 312 within the reference document 310. The location may be expressed in terms of a region (e.g., a particular rectangular section) in a coordinate system (e.g., Cartesian coordinates within the reference document 310), where the region encompasses the piece of metadata 312A. The locations of particular pieces of metadata may be used to calculate distances between the pieces of metadata 312A, ..., 312N in the reference document 310. The distances between the pieces of metadata 312A, ..., 312N may be used, for example, to import the structured metadata 320 into a form or document.

The reference document type 316 may be a category that describes the reference document 310. For example, the reference document type 316 may be a general category, such as tax document, payroll document, legal document, and the like. The reference document type 316 may also be a specific category, such as Schedule 1 of a Federal Tax Form, application for a California Driver's license, and the like. Structured metadata 320 may be organized according to the reference document type 316 associated with a particular reference document 310 so that structured metadata 320 may be queried using the reference document type 316. The reference document type 316 may also be used as a feature of classification machine learning models to facilitate classifying aspects of structured metadata 320, the reference document 310 and or the structured form representation 220.

Figure 5A:
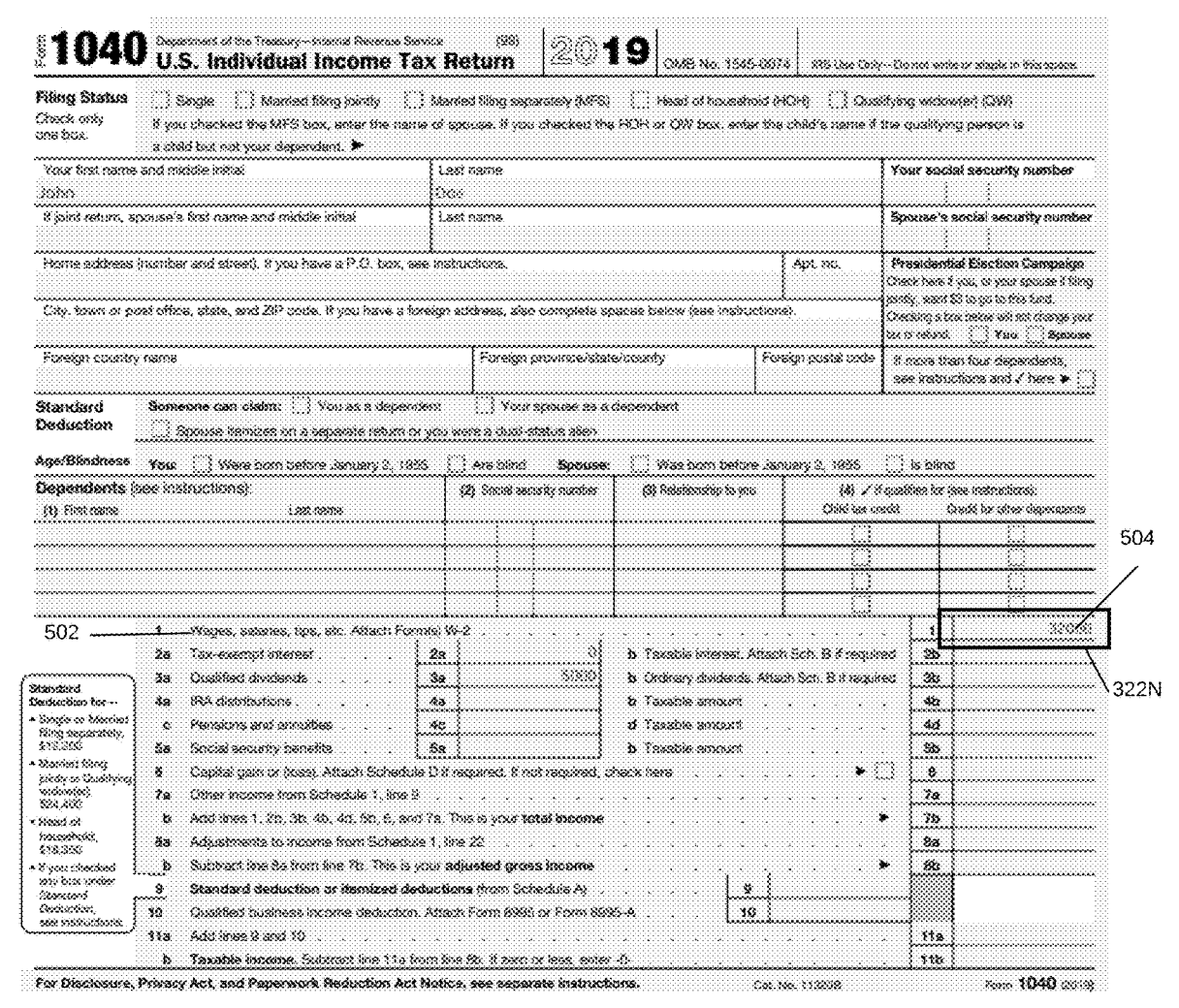
Figure 5B:
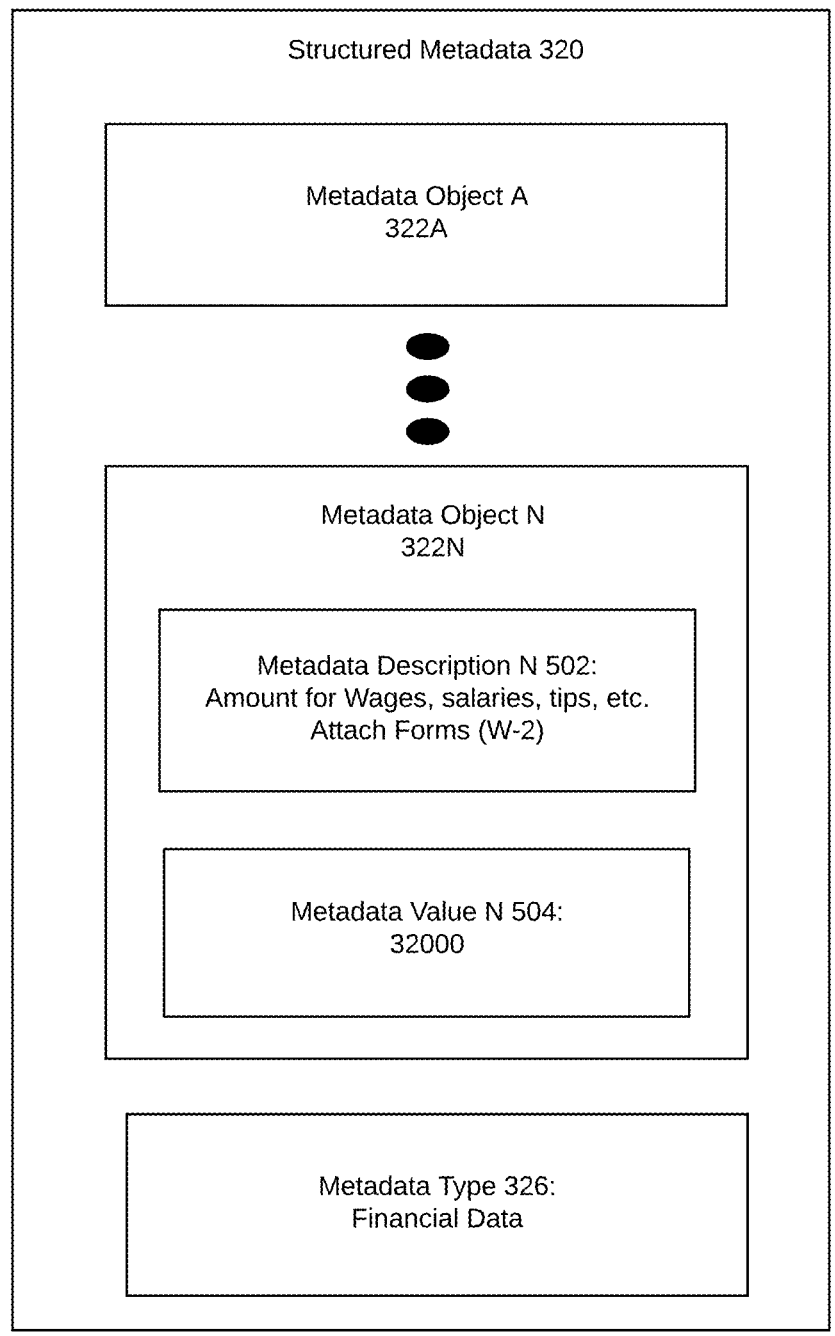
FIG. 5B illustrates exemplary structured metadata according to an embodiment of the present disclosure.

The structured metadata 320 may be a schema representation of the metadata input into a form. For example, the schema may be represented using JSON or XML. The structured metadata 320 may include metadata objects 322A, ..., 322N and a metadata representation type 326. A metadata object 322A may include one or more metadata components 324A, ..., 324N. A metadata component 324A may describe the aspects of each piece of metadata included in the metadata object 322A. For example, the metadata components 324A, ..., 324N may include line descriptions, line numbers, field coordinates, and other information describing the location of the field including the piece of metadata 312A that corresponds to the metadata object 322A. The metadata components 324A, ..., 324N may also include the field descriptions that describe the data entered into the field. The metadata components 324A, ..., 324N may also include the data input into the fields, for example, text, amounts, and or values. For example, as shown in FIGS. 5A and 5B, the metadata object 322N may be a structured representation of the piece of metadata entered into line 1 of the form 1040. As shown in the structured metadata 320 format illustrated in FIG. 5B, the metadata components for the metadata object 322N may include a metadata component description 502 that describes the metadata entered into the field on line 1 of form 1040, The metadata components may also include a metadata component value 504 that includes the number that was input into the field on line 1. A metadata component 324A may include, for example, whether the metadata was input by hand or typed, the location of the metadata within the reference document 310, and the like.

Referring again to FIG. 3. the metadata object 322A may correspond to a group of metadata components that are relevant to a particular context, a particular field included in the reference document 310, and or a particular region of the reference document 310 (e.g., a particular location defined by, for example, a line number or Cartesian coordinates). For example, the metadata object 322A may correspond to an area within the reference document 310 that is within a threshold distance of the particular location. The metadata object 322A may include the metadata components 324A, ..., 324N that correspond to the pieces of metadata 312A, ..., 312N that are within the threshold distance of the particular location in the reference document 310.

The metadata type 326 may be a label (e.g., data type, representation format, intended application, and the like) that describes the structured metadata 320. The metadata type 326 may correspond to the reference document type 316 of the reference document 310. For example, the metadata type 326 may be a general category, such as financial data, numeric values, personal information, and the like. Alternatively, the metadata type 326 may be a specific category, for example, financial data included in form 1040 of a U.S. Individual Income Tax Return, person information included in an application for a California Driver's license, and the like. The structured metadata 320 included in the repository 202 may be accessed (i.e., queried) using the metadata type 326.

To generate structured metadata 320, the classification layer 208 may use the structured form representation 220 to locate the pieces of metadata included in the reference document 310. The form components 224A, ..., 224N of the structured form representation 220 may be parsed to locate input fields (e.g., fields for inputting person information fields and wages) within the reference document 310. For example, the structured form representation 220 may be parsed to locate the fields within the W-2 form. The form components 224A, ..., 224N of the structured form representation 220 may already be selected based on relevance to a particular context (e.g., preparing a text return). Therefore, the structured form representation 220 may be parsed to locate only the input fields containing metadata that is relevant to the particular context. The metadata input into the relevant fields in the reference document 310 are then extracted and assembled as structured metadata 320.

The classification layer 208 may also include one or more machine learning models, for example, one or more metadata models 330A, ..., 330N. The metadata models 330A, ..., 330N may include supervised models and or unsupervised models with functionality to receive the reference document 310 and structured form representation 220 as input and output classification predictions used to generate the structured metadata 320. The metadata models 330A, ..., 330 may also cluster metadata components into metadata objects to provide a more granular classification of structured metadata 320 that may facilitate combining, extracting, and otherwise manipulating structured metadata 320 and metadata objects 322A, ..., 322N during information management and document processing operations. For example, the structured metadata may be parsed to locate a first metadata object including a first category of metadata (e.g., person information) and a second metadata object including a second category of metadata (e.g., financial data). A value component (e.g., a name) included in the first metadata object of the structured metadata may be transferred to a particular field in the compliance form that requires the first category of metadata. To complete the form, a second value component (e.g., a wage amount) included in the second metadata object of the structured metadata may be transferred to a particular field in the form that requires the second category of metadata. For example, to complete a compliance form such as a form 1040 tax return a metadata object from first structured metadata that includes personal information generated from a patient intake reference document may be combined with a metadata object that includes a wage amount generated from a W-2 reference document. In additional to combining metadata components, one or more calculations, operations, additions, subtractions, edits, or other manipulations may be applied to metadata components to generate input used to complete a form.

The metadata models 330A, ..., 330N may classify the pieces of metadata 312A, ..., 312N as different types of metadata components 324A, ..., 324N based on the attributes 314. For example, the metadata models 330A, ..., 330N may classify the piece of metadata 312A as a "description" metadata component (e.g., a description of an input field containing the metadata, a description of the location of the input field, etc.). The metadata models 330A, ..., 330N may also classify the piece of metadata 312A as a "value" metadata component (e.g., a string of text or a number input into a field, a check mark input into a box, and the like). The metadata models 330A, ..., 330N may also determine a category for pieces of metadata 312A, ..., 312N classified as a "value" metadata component (e.g., financial data, personal information, question response, etc.).

The metadata models 330A, ..., 330N may be trained to recognize features 332 observed in training data. The features may be derived from the pieces of metadata 312A, ..., 312N and their corresponding attributes 314. The attributes 314 may include, for example, labels describing the various types of metadata components. Exemplary training data may include sample pieces of metadata including names, addresses, and social security numbers input into references documents. The pieces of metadata may be associated with a personal information attribute 314. In addition to descriptions of the type data included in the pieces of metadata, other attributes 314 may include characteristics of the pieces of metadata (e.g., the text, font, location, and the like). To classify a piece of metadata 312A included in the reference document 310 as personal information, the metadata models 330A, ..., 330N may compare the features 332 associated with pieces of metadata having a personal data attribute in the training data to the features derived from the piece of metadata 312A. If the models recognize one or more features of personal information in the piece of metadata 312A, the piece of metadata may be classified as personal information. For example, if the piece of metadata 312A may be classified as a name or personal information if it includes two strings of characters separated by a space, has a capitalized character as the first character in each string, and or include another characteristic that matches the pieces of metadata in the training data having name and or personal information attributes. Similarly, the metadata models 330A, ..., 330N may classify the piece of metadata 312A as a "description" metadata component if it is located a distance away from an input field that matches or is close to the distance away from input fields of the pieces of metadata having "description" metadata attributes in the training data.

The metadata models 330A, ..., 330N may include functionality to perform the classification using one or more features 332. The features 332 may be derived from the attributes 314 of the pieces of metadata 312A, ..., 312N and or the attributes 214 of the document elements 212A, ..., 212N. To derive the features 332 for the reference document 310, the metadata models 330A, ..., 330N may be applied to the attributes 314, pieces of metadata 312A, ..., 312N, and or the reference document type 316. For example, features 332 may include word vectors, word embeddings, or other representations of text included the pieces of metadata 312A, ..., 312N. The features 332 may also include context features generated based on the words surrounding a particular word or phrase included in a particular piece of metadata and or the pieces of metadata 312A, ..., 312N surrounding the particular piece of metadata. The features may also be derived from the attributes 214, 314. For example, the features 332 may be based on aggregating or summarizing the attributes 214 of the document elements 212A, ..., 212N and or the attributes 314 of the pieces of metadata 312A, ..., 312N. The model features 332 may also be based on statistical measurements applied to the attributes 214 of the document elements 212A, ..., 212N and or the attributes 314 of the pieces of metadata 312A, ..., 312N. Alternatively, the model features 332 may represent any distinguishing characteristics corresponding to the attributes 214 of the document elements 212A, ..., 212N and or the attributes 314 of the pieces of metadata 312A, ..., 312N.

Based on the predicted classifications, the pieces of metadata 312A, ..., 312N in the reference document 310 may be included in a metadata object 322A assembled into structured metadata 320. Structured metadata 320 may include pieces of metadata that are similar to each other. For example, the structured metadata 320 may include all personal information pieces of metadata 312A, ..., 312N included in a reference document 310 and or all financial data pieces of metadata 312A, ..., 312N included in a reference document 310. To select the similar pieces of metadata 312A, ..., 312N, the metadata models 330A, ..., 330N may cluster the pieces of metadata according to one or more classifications. The metadata models 330A, ..., 330N may also cluster the pieces of metadata based on distance and other attributes and of features 332 as described below. Structured metadata 320 may include groups of similar pieces of metadata 312A, ..., 312N to facilitate transferring the information included in metadata to a particular document and or record.

To cluster the metadata components 324A, ..., 324N having a similar class and or function into metadata objects 322A, ..., 322N, the metadata models 330A, ..., 330N may derive features 332 for the pieces of metadata 312A, ..., 312N using the attributes 314, aspects of the pieces of metadata 312A, ..., 312N (e.g., the value input into the field), and or the reference document type 316 as described above. A vector representation of the metadata components 324A, ..., 324N detected in the reference document 310 may be calculated based on the features 332 derived for the pieces of metadata 312A, ..., 312N that correspond to the metadata components 324A, ..., 324N. The vector representations of the metadata components 324A, ..., 324N may be mapped to a feature space. The feature space may be a multidimension space wherein the number of dimensions in the feature space corresponds to the number of features 332 used to calculate the vector representations. One or more convolution operations may also be applied to reduce the dimensionality of the feature space. A distance separating the metadata components 324A, ..., 324N within the feature space may be calculated. The metadata components 324A, ..., 324N components that have a distance that is less than a threshold distance away from one or more other metadata components 324A, ..., 324N, a defined position in the features space, and or a particular form component that is known to be relevant may be determined to be relevant to a particular context and or useful for a particular application and may be included in the structured metadata 320. Once the structured metadata 320 is generated by the classification layer 206, the structured metadata 320 may be provided to the integration layer 208.

The machining learning models including the form models 230A, ..., 230N and or the metadata models 330A, ..., 330N may be implemented as classifiers using XGBoost (available at https://github.com/dmlc/xgboost). Alternatively, the machine learning models may be implemented as k-nearest neighbor (k-NN) classifiers. The machine learning models may be implemented as various types of deep learning classifiers, such as a neural network classifier (based on convolutional neural networks (CNNs)), random forest classifier, SGD classifier, lasso classifier, gradient boosting classifier, bagging classifier, ada boost classifier, ridge classifier, elastic net classifier, or NuSVR classifier. Deep learning, also known as deep structured learning or hierarchical learning, is part of a broader family of machine learning methods based on learning data representations, as opposed to task-specific algorithms.

Exemplary machine learning models that perform the clustering operations described above may use a variety of techniques (e.g., k-means clustering, centroid-based clustering, hierarchical clustering, distribution-based clustering, density-based clustering, naive Bayes, etc.) to perform the clustering. The machine learning models may also include functionality to perform the clustering using a distance measure based on geometric attributes and or other attributes 214 of the of document elements 212A, ..., 212N corresponding to the form components 224A, ..., 224N and or attributes 314 of the pieces of metadata 312A, ..., 312N corresponding to the metadata components 324A, ..., 324N. For example, the distance measure may be based on a Cartesian distance between the boundaries of the document elements 212A, ..., 212N and or pieces of metadata 312A, ..., 312N. Therefore, form components 224A, ..., 224N whose corresponding document elements 212A, ..., 212N are within a threshold distance of each other may be clustered within the same form object 222A. Metadata components 324A, ..., 324N whose corresponding pieces of metadata 312A, ..., 312N are within a threshold distance of each other may be within the same metadata object 322A. The distance measure may also be based on a particular location within the document 210 and or reference document 310. For example, the document elements 212A, ..., 212N within a threshold distance of the Cartesian coordinates of a particular location (e.g., a line in the Cartesian plane) within the document 210 may be clustered within the same form object 222A. Similarly, pieces of metadata 312A, ..., 312N within a threshold distance of the Cartesian coordinates of a particular location (e.g., a line in the Cartesian plane) within the reference document 310 may be clustered within the same metadata object 322A. The machine learning models may include functionality to associate form components 224A, ..., 224N within a form object 222A and or metadata components 324A, ..., 324N within a metadata object 322A using the distance measure. For example, multiple form objects 222A, ..., 222N and or multiple metadata object 322A, ..., 322N may be clustered into a larger form component and or metadata component respectively. The larger form component and or metadata component may correspond to a particular section or page that includes the multiple form objects 222A, ..., 222N, and or metadata objects 322A, ..., 322N.

Once generated, the structured form representation 220 and or the structured metadata 320 may be provided to the integration layer 208. The integration layer 208 may interface with one or more information services that consume and process documents. The integration layer 208 may also interface with a service that allows users to review the structured metadata 320 and or structured form representation 220 to verify the accuracy of the predictions made by the machine learning models. The integration layer 208 may interface with the services via, for example, an API. To facilitate manual review of the structured form representation 220 and or the structured metadata 320, the review API 340 may provide the structured form representation and or structured metadata 320 to the review service. To review the structured metadata 320, the review service may provide a review user interface (UI) including one or more screens that display the metadata components 324A, ..., 324N encompassed within each of the metadata objects 322A, ..., 322N included in the structured metadata 320. The review UI may receive inputs from the user indicating whether or not the predicted classifications of the pieces of metadata 312A, ..., 312N reflected in the metadata components 324A, ..., 324N accurately describes the pieces of metadata 312A, ..., 312N included in the reference document 310. For example, the review UI may display a piece of metadata (e.g., the number 32000) entered into a field included in the reference document 310 along with the components and classifications that correspond to the piece of metadata 312A (i.e., the description component, the value component, the category of the metadata, and the like). The user may review the piece of metadata and the predicted classifications to determine the classifications predicted by the metadata models 330A, . . . , 330N are accurate. For example, if the description of the 32000 piece of metadata (i.e., "amount of wages from W-2 form") is accurately predicted to be the description component, if the value of the 32000 piece of metadata (i.e., "32000") is accurately predicted to be the value component, and if the category for the 32000 piece of metadata is accurately predicted to be financial data.

To facilitate review of the structured form representation 220, the review service may provide a review user interface (UI) including one or more screens that display the form components 224A, . . . , 224N encompassed within each of the form objects 222A, . . . , 222N. The review UI may receive inputs from the user indicating whether or not the relevance predictions for the document elements 212A, . . . , 212N are accurate. The review UI may display the form components 224A, . . . , 224N that were determined to be relevant to a particular context. For example, all the form components 224A, . . . , 224N from a structured form representation 220 of a W-2 tax form that are relevant to preparing an income tax return may be displayed in the review UI. The user may review the form components 224A, . . . , 224N to determine if each form component 224A correspond to a document element 212A and or if the form components 224A, . . . , 224N are relevant to preparing an income tax return.

If the predictions are correct, the UI may receive an input from the user confirming the predictions are accurate. If one or more of the predictions is incorrect, the UI may receive an input from the user indicating the predictions that are incorrect and or the correct prediction. Inputs received by the UI may be used to label predictions as accurate or inaccurate. The accuracy labels may be associated with the pieces of metadata 312A, . . . , 312N and or the document elements 212A, . . . , 212N and their respective original predicted classifications. The document elements 212A, . . . , 212N or pieces of metadata 312A, . . . , 312N and their respective accuracy labels, and original prediction classifications may be provided back to the classification layer and or extraction layer and added to the training data that is used to train the machine learning models (e.g., the form models 230A, . . . , 230N and the metadata models 330A, . . . , 330N). Over time as the machine learning models make more predications and more predicated classifications are reviewed manually, the library of pieces of metadata 312A, . . . , 312N and or document elements 212A, . . . , 212N having classifications and accuracy labels grows. The machine learning models may then learn to recognize more patterns, variables, and combinations thereof within the training data that may be used to identify the pieces of metadata 312A, . . . , 312N and of document elements 212A, . . . , 212N having a particular classification and or relevance to a particular context. By leveraging the additional patterns, variables, and combinations thereof unique to each classification, the accuracy of the predictions generated by the metadata models 330A, . . . , 330N may improve.

The integration layer 208 may also interface with one or more information services that provide document processing functionality. For example, the integration layer 208 may include a form completion API 342 that provides structured metadata 320 to an information service providing functionality for completing forms and other documents without manual data entry. The value component included in the structured metadata 320 provided by the form completion API 342 may be transferred to one or more forms requiring input of the same data as the reference document 310 to populate the one or more forms with the one or more values included in the structured metadata. The structured metadata 320 may be provided to the information services in any machine-readable format (e.g., structured JSON, XML, HTML, PDF, and the like.). Properties that define how to access, import, and use the content (e.g., the value component) included in the structured metadata 320 may be included within the JSON file or other structured representation of the structured metadata 320. The properties may be read by the information services receiving the structured metadata and used to determine the operations performed by the information services to consume the structured metadata 320 in one or more workflows and or functionalities provided by the information services.

For example, the metadata components 324A included in the structured metadata 320 may be used to identify metadata the corresponds to one or more fields in an incomplete form. Once the correct metadata is identified, the value component may be used to transfer the metadata into the correct field in the form to complete the form by populating one or more fields in the form with the value component included in the structured metadata 320. Metadata components 324A, . . . , 324N in one or more metadata objects 322A, . . . , 322N may be combined to automatically complete a form by populating fields in the form with content included in the metadata components 324A, . . . , 324N of the structured metadata 320. For example, metadata components 324A, . . . , 324N from one or more financial documents that contain personal information (e.g., name, age, address, and the like) and metadata components 324A, . . . , 324N from one or more medical insurance documents (e.g., history of medical conditions, recent hospital visits, and the like) may be combined to complete a set of new patient intake forms for a healthcare provider. The metadata objects 322A, . . . , 322N used to populate the forms may include metadata components 324A, . . . , 324N having the same and or different category of metadata.

The integration layer 208 may also include a data manipulation API 344 that integrates with one or more information management services. The data manipulation API 344 may provide structured metadata 320 to the information service to transfer the metadata input into the reference document into a record maintained by the information service. For example, the income information collected from a tax document may be used to update a customer record in a customer relationship management application.

The integration layer 208 may also include a document import API 346 that integrates with one or more document processing services. The document import API 346 may provide a structured form representation 220 to transfer one or more aspects of a form into the document processing service. For example, the form components 224A, . . . , 224N of the structured form representation 220 may be used to update the version of a W-2 form consumed by a tax preparation software. The updated W-2 version may be used to modify the content of UI's displaying questions to users that elicit the information required to comply with new regulations reflected in the updated W-2 version. The form completion API 342 and or document import API 348 may provide structured metadata 320 generated from a W-2 reference document to automatically complete the updated questions.

The information transfer engine 250 may include functionality to acquire document elements 212A, ..., 212N and attributes 214 describing the document elements 212A, ..., 212N from a document 210. The information transfer engine 250 may also include functionality for acquiring pieces of metadata 312A, ..., 312N and attributes 314 describing the pieces of metadata 312A, 312N from the reference document 310. Additionally, the information transfer engine 250 may include functionality to derive features 232 for the form models 230A, ..., 230N and features 332 for the metadata models 330A, ..., 330N using the attributes 214 of document elements 212A, ..., 212N and or the attributes 314 of the pieces of metadata 312A, ..., 312N.

Information transfer engine 250 may include functionality to generate a structured form representation 220 and or structured metadata 320. The information transfer engine 250 may also include functionality to replace and or update a structured form representation 220 and or a structured metadata 320 stored in the repository 202. The computer processor 240 may include functionality to execute the information transfer engine 250. The information transfer engine 250 may be implemented in hardware (e.g., circuitry), software, firmware, and/or any combination thereof.

While FIGS. 2-3 show a configuration of components, other configurations may be used without departing from the scope of the disclosed principles. For example, various components may be combined to create a single component. As another example, the functionality performed by a single component may be performed by two or more components.

Figure 6:
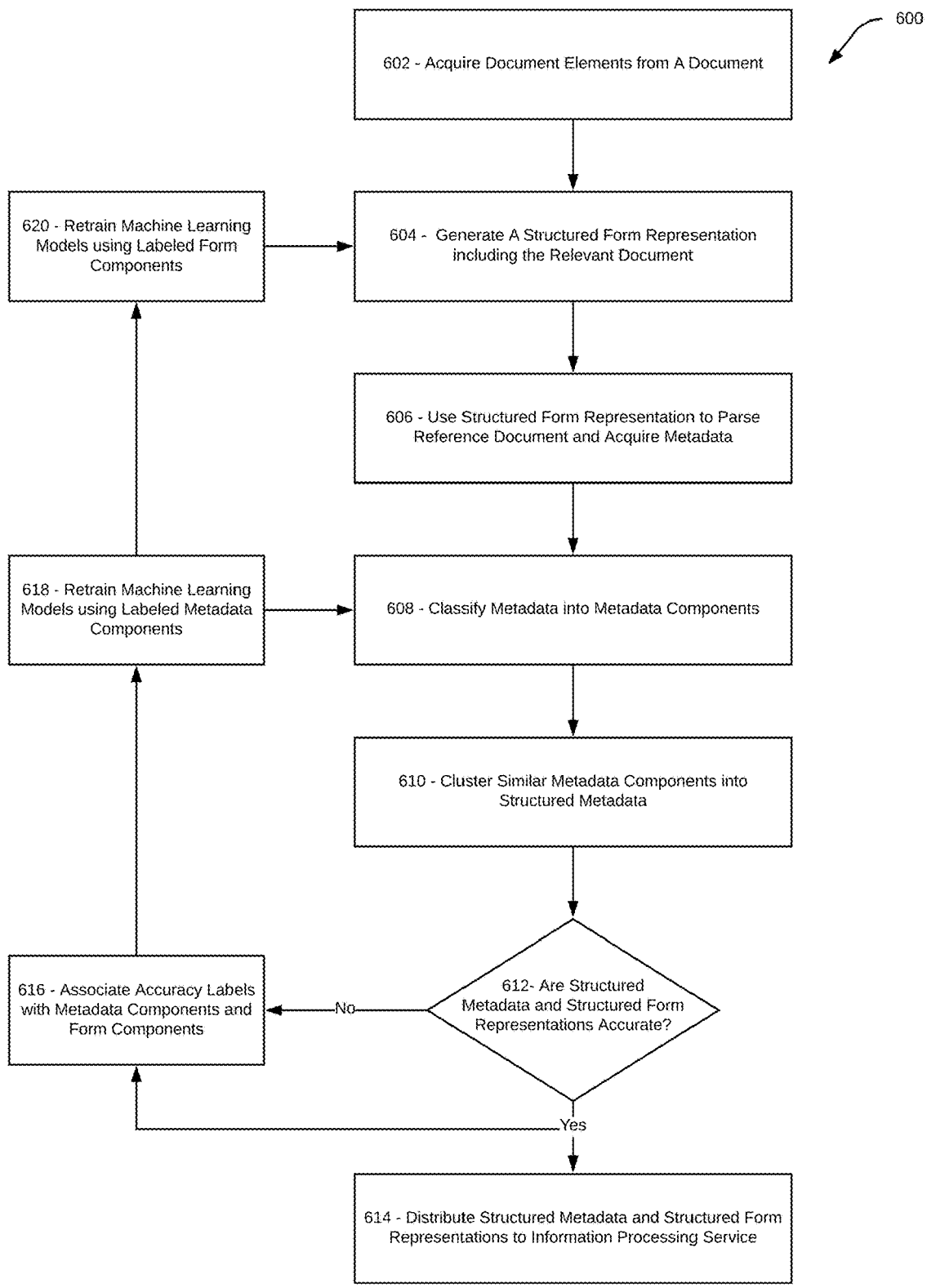
FIG. 6 shows a flow diagram illustrating an exemplary process for generating and using structured form representations and structured metadata according to an embodiment of the present disclosure.

FIG. 6 is a flow chart illustrating an exemplary process 600 for generating and using structured representations of forms and form metadata. The process 600 may be implemented using the computer system 200 shown in FIGS. 2-3. At step 602, the computer system receives a document and may acquire a plurality of document elements from the document. The document may be a form having one or more fields receiving input from a user. The document may be any type of document or form including, for example, financial forms, tax documents, government forms, medical forms, applications for items and services, and the like.

At step 604, the computer system may process the document to generate a structured form representation. The structured form representation may be a schema representation of the document that includes the document elements (e.g., lines, text, object, images, and other aspects) organized in a machine readable format. To generate the structured form representation, the document elements acquired at 602 may be classified into form components using one or more machine learning models. The machine learning models may also determine if the document elements are relevant to a particular context. The machine learning models may generate a prediction that indicates the document elements are relevant to, for example, collecting information required to complete and income tax return or update a previous version of a government document. The machine learning models may cluster the form components corresponding to the document elements based on the relevance prediction. The machine learning models may also cluster the form components based on a distance metric and or similarity to a particular criterion. The form components may be assembled into a structured form representation based on the clustering.

At step 606, the computer system may receive a reference document and acquire metadata from the reference document. The reference document may be the same form or other document as the document received at step 602. However, the reference document may have data input into the one or more fields (i.e., metadata) included in the document. The structured form representation generated at step 604 may be used to parse the reference document to locate the metadata. For example, the form components included in the structured form representation may be used to identify the components of the reference document. The reference document may be parsed to locate the input fields. Once the fields are located, the pieces of metadata input into the fields may be extracted.

At step 608, the pieces of metadata are classified into metadata components using one or more machine learning models. For example, the piece of metadata input into a field may be classified as a "value" component, the description of the field may be classified as a "description" component. The machine learning models may also classify pieces of metadata into categories (i.e., personal information, financial data, medical data, and the like) based on the type of information included in the piece of metadata. At 610, the machine learning models may cluster the metadata components according to the category corresponding to each component to aggregate metadata components having the same category. For example, all metadata components classified as personal information (i.e., name, address, social security number, etc.) may be clustered together. Metadata components may also be clustered based on a similarity to a particular criterion and or proximity to a particular position within the reference document. Based on the clustering, metadata components may be assembled into a structured metadata representation. The structured metadata may be a schema format of the pieces of metadata. The schema format may be machine readable and automatically transferred into a digital form without manual data entry.

At 612, the structured metadata and structured form representation may be reviewed for accuracy. To review the structured metadata, the schema format of the pieces of metadata included in the referenced document may be displayed in a user interface that may receive inputs from users. Similarly, to review the structured form representation, the schema format of the document elements corresponding to the form elements, may be displayed in a user interface that may receive inputs from users. Users may manually review the schema formats of the pieces of metadata and document elements in the user interface and input a response indicating the metadata component classification corresponding to the piece of metadata or the form component classification and or relevance prediction for the document elements was either correct or incorrect. If the classification was incorrect, the user may input the correct classification into the user interface. For example, if the piece of metadata "John Doe" was classified as a description component or classified into the category of medical data, the user may indicate the classification was incorrect and specify the piece of metadata "John Doe" is a "value component" and or is in the personal information category. If the classification is correct, the user may indicate the classification was correct in the user interface.

At step 616, accuracy labels (i.e., the correct classification or incorrect classification response received from the users) may be associated with the pieces of metadata and or the document elements. The pieces of metadata and document elements having the accuracy labels may be added to training data used to train the machine learning models. At step 618, the machine learning models for classifying the pieces of metadata into metadata components may be retrained using training data, including the labeled pieces of metadata generated at step 616. The accuracy of the classification predictions made by the machine learning models at step 608 may be improved by training on new the training data generated from the manual review at step 612. At step 620, the machine learning models for classifying the document elements into form components may be retrained using training data including the labeled document elements generated at step 616. The accuracy of the classification predications made by the machine learning models at step 604 may be improved by training on the new training data generated from the manual review at step 612.

To guarantee a level of accuracy of the structured metadata and the structured form representation, the generating (i.e., steps 604-610), review (i.e., step 612), and retaining (i.e., steps 616-620) processes may be repeated until all of the predications are accurate and or the predictions are within an acceptable error threshold. Once the structured metadata and or structured form representations are approved, they may be distributed to one or more information services at step 614. For example, the structured form representation may be transferred to a form generation service to update the version of the target form to complete and or add any new or updated requirements in the new form to the software so that the software can be programmed to collect the information necessary to fulfill the new and or updated requirements. The structured metadata may be, for example, transferred directly into a form or document and or used to update a record with new and or changed information.

Figure 7:
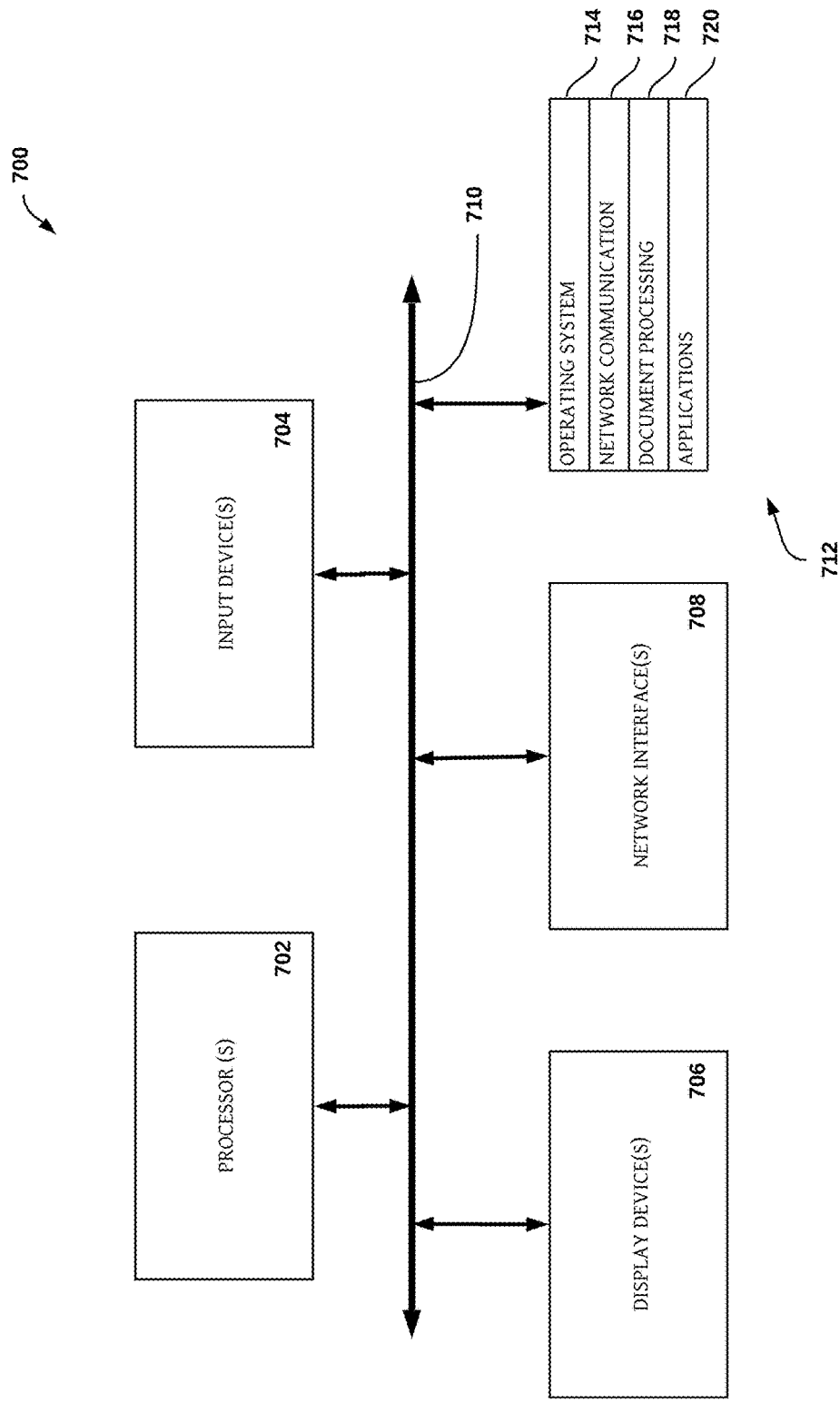
FIG. 7 is a block diagram illustrating a computing device according to an embodiment of the present disclosure.

FIG. 7 is a block diagram of an example computing device 700 that may implement various features and processes as described herein. For example, computing device 700 may function as first server 120, second server 130, computer system 200, or a portion or combination thereof in some embodiments. The computing device 700 may be implemented on any electronic device that runs software applications derived from compiled instructions, including without limitation personal computers, servers, smart phones, media players, electronic tablets, game consoles, email devices, etc. In some implementations, the computing device 700 may include one or more processors 702, one or more input devices 704, one or more display devices 706, one or more network interfaces 708, and one or more computer-readable media 712. Each of these components may be coupled by a bus 710.

Display device 706 may be any known display technology, including but not limited to display devices using Liquid Crystal Display (LCD) or Light Emitting Diode (LED) technology. Processor(s) 702 may use any known processor technology, including but not limited to graphics processors and multi-core processors. Input device 704 may be any known input device technology, including but not limited to a keyboard (including a virtual keyboard), mouse, track ball, and touch-sensitive pad or display. Bus 710 may be any known internal or external bus technology, including but not limited to ISA, EISA, PCI, PCI Express, USB, Serial ATA or FireWire. Computer-readable medium 712 may be any non-transitory computer readable medium that participates in providing instructions to processor(s) 702 for execution, including without limitation, non-volatile storage media (e.g., optical disks, magnetic disks, flash drives, etc.), or volatile media (e.g., SDRAM, ROM, etc.).

Computer-readable medium 712 may include various instructions 714 for implementing an operating system (e.g., Mac OS®, Windows®, Linux) 714. The operating system instructions 714 may provide an operating system that may be multi-user, multiprocessing, multitasking, multithreading, real-time, and the like. The operating system may perform basic tasks, including but not limited to: recognizing input from input device 704; sending output to display device 706; keeping track of files and directories on computer-readable medium 712; controlling peripheral devices (e.g., disk drives, printers, etc.) which can be controlled directly or through an I/O controller; and managing traffic on bus 710. Network communications instructions 716 may establish and maintain network connections (e.g., software for implementing communication protocols, such as TCP/IP, HTTP, Ethernet, telephony, etc.).

Document processing instructions 718 may include instructions that implement the disclosed process for generating and using structured metadata and structured form representations as described herein.

Application(s) 720 may be an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As can be appreciated, the principles disclosed herein can acquire and manipulate information included documents and forms having any format. The disclosed principles can scan documents and recognize relevant information irrespective of the position and or coordinates of the information within the document. Therefore, the data acquisition techniques disclosed herein are more flexible than conventional optical character recognition and other rules based approaches and can be adapted to new documents and updated document versions using less developer time and fewer processing resources. The machine learning based approaches to generating machine readable representations of forms and metadata input into forms described herein are also more flexible and efficient than rules based techniques. The machine learning models may be scaled to classify document elements and pieces of metadata collected from a wide variety of documents and reference documents without requiring document specific rules. The machine learning models therefore require fewer storage resources to maintain and less processing load to execute relation to document specific rules based approaches. Accordingly, the machine learning approaches described herein can acquire and manipulate information included in different document types more accurately with fewer computational resources relative to rules based document processing methods.

Another benefit of the disclosed principles is that they generate labeled training data that may be used to improve the accuracy of the machine learning models used to generate the structured metadata and structured form representations. These are major improvements in the technological art as they improve the functioning of the computer and are an improvement to the technology and technical fields of document processing, document scanning, information transfer, and structured data generation (e.g., updating document templates, importing new documents and updated document version into software, automated data entry for document completion, and updating records to included new and or updated information).

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method for providing and using structured metadata, the method comprising:
   acquiring, by a computer, from a tax form in a digital format, a plurality of tax form elements and a plurality of attributes describing the plurality of tax form elements, wherein at least one of the tax form elements is a field that receives data;
   detecting, by the computer a plurality of form components using the plurality of attributes wherein each form component corresponds to a tax form element included in the plurality of tax form elements;
   determining, by the computer a relevance to a particular context for the tax form element corresponding each form component in the plurality of form components by applying a first machine learning model to the attributes of the plurality of tax form elements;
   acquiring, by the computer, for the tax form element corresponding to each form component, an accuracy label for the relevance to the particular context determined by the first machine learning model, wherein the accuracy label indicates whether the tax form element is relevant to the particular context or not relevant to the particular context, wherein the context includes filing a tax return;
   generating, by the computer, training data that includes the tax form element corresponding to each form component and the accuracy label for the tax form element, wherein tax form element is represented as vectors indicating one or more location of the tax form element, type of the tax form element, type of data associated with the tax form element, and statistical data of how frequently a field associated with the tax form element was left blank;

retraining, by the computer, the first machine learning model using the training data;

re-determining, by the computer, the relevance to the particular context of the tax form element using the first machine learning model retrained on the training data;

clustering, by the computer the plurality of form components into a structured form representation based on the relevance to the particular context of the tax form element corresponding to each form component;

using, by the computer, the structured form representation to acquire, by the computer, from a reference tax form including the plurality of tax form elements, metadata input into the field and a plurality of attributes describing the metadata;

clustering, by the computer, a plurality of metadata components corresponding to the metadata into structured metadata by applying a second machine learning model to the plurality of attributes describing the metadata; and distributing, by the computer at least one of the structured form representation and the structured metadata to a server providing a tax filing service to complete filing the tax return.

2. The method of claim 1, further comprising:

deriving features for the plurality of tax form elements using the attributes; and calculating a vector representation for each form component based on the features for tax form element that corresponds to each particular form component and one or more attributes describing the particular form component.

3. The method of claim 2, wherein the clustering comprises mapping the vector representation for each form component to a feature space;

determining a distance within the feature space separating each form component; and aggregating each form component separated by a distance less than a threshold distance into a form object included in the structured form representation.

4. The method of claim 2, wherein the features include at least one of a textual feature and a context feature.

5. The method of claim 2, wherein the features are derived by aggregating one or more of the plurality of attributes describing the tax form elements.

6. The method of claim 2, wherein the features are derived by applying statistical measurements to the plurality of attributes describing the tax form elements.

7. The method of claim 1, further comprising populating a compliance form using the structured metadata, wherein the structured metadata further comprises a plurality of metadata objects and each metadata object includes a different category of metadata.

8. The method of claim 7, wherein the populating the compliance form further comprises:

parsing the structured metadata to locate a first metadata object including a first category of metadata;

parsing the structured metadata to locate a second metadata object including a second category of metadata;

transferring a first value component included in the first metadata object of the structured metadata to a particular field in the compliance form that requires the first category of metadata; and transferring a second value component included in the second metadata object of the structured metadata to a particular field in the compliance form that requires the second category of metadata.

9. The method of claim 1, further comprising, updating a record of an entity by importing new and or updated information for the entity from the structured metadata.

10. A system comprising:

a memory coupled to a computer processor;

a repository configured to store:

a tax form in a digital format comprising a plurality of tax form elements and a plurality of attributes describing the plurality of tax form elements, wherein at least one of the tax form elements is a field that receives data;

a reference tax form including the plurality of tax form elements, metadata input into the field, and a plurality of attributes describing the metadata;

a structured form representation comprising a plurality of form components;

structured metadata comprising a plurality of metadata components;

a first machine learning model; and a second machine learning model; and an information transfer engine, executing on the computer processor and using the memory, configured to:

acquire, from the tax form, the plurality of tax form elements and the plurality of attributes describing the plurality of tax form elements;

detect the plurality of form components using the plurality of attributes wherein each form component corresponds to a tax form element included in the plurality of tax form elements;

determine a relevance to a particular context for the tax form element corresponding to each form component in the plurality of form components by applying the first machine learning model to the plurality of attributes describing the plurality of tax form elements;

acquire for the tax form element corresponding to each form component, an accuracy label for the relevance to the particular context determined by the first machine learning model, wherein the accuracy label indicates whether the tax form element is relevant to the particular context or not relevant to the particular context, wherein the context includes filing a tax return;

generate training data that includes the tax form element corresponding to each form component and the accuracy label for the tax form element, wherein tax form element is represented as vectors indicating one or more location of the tax form element, type of the tax form element, type of data associated with the tax form element, and statistical data of how frequently a field associated with the tax form element was left blank;

retrain the first machine learning model using the training data;

re-determine the relevance to the particular context of the tax form element using the first machine learning model retrained on the training data;

cluster the plurality of form components into the structured form representation based on the relevance to the particular context of the tax form element corresponding to each form component;

using the structured form representation, acquire, from the reference tax form, the metadata input into the field and the plurality of attributes describing the metadata;

cluster a plurality of metadata components corresponding to the metadata into the structured metadata by applying the second machine learning model to the plurality of attributes describing the metadata; and distribute at least one of the structured form representation and the structured metadata to a server providing a tax filing service to complete filing the tax return.

11. The system of claim 10, wherein the information transfer engine is further configured to:

derive features for the plurality of tax form elements using the plurality of attributes describing the tax form elements; and calculate a vector representation for each form component based on the features for tax form element that corresponds to each particular form component and one or more attributes describing the particular form component.

12. The system of claim 11, wherein the information transfer engine is further configured to cluster the form components by:

mapping the vector representation for each form component to a feature space;

determining a distance within the feature space separating each form component; and aggregating each from component separated by a particular distance less than a threshold distance into a form object included in the structured form representation.

13. The system of claim 11, wherein the features include at least one of a representation of a textual feature and a context feature.

14. The system of claim 11, wherein the information transfer engine is further configured to derive the features by aggregating one or more of the plurality of attributes describing the tax form elements.

15. The system of claim 11, wherein the information transfer engine is further configured to derive the features by applying statistical measurements to the plurality of attributes describing the tax form elements.

16. The system of claim 10, wherein the information transfer engine is further configured to populate a compliance form using the structured metadata, wherein the structured metadata further comprises a plurality of metadata objects and each metadata object includes a different category of metadata.

17. The system of claim 16, wherein the information transfer engine is further configured to populate the compliance form by:

parsing the structured metadata to locate a first metadata object including a first category of metadata;

parsing the structured metadata to locate a second metadata object including a second category of metadata;

transferring a first value component included in the first metadata object of the structured metadata to a particular field in the compliance form that requires the first category of metadata; and transferring a second value component included in the second metadata object of the structured metadata to a particular field in the compliance form that requires the second category of metadata.

18. The system of claim 10, wherein the information transfer engine is further configured to update a record of an entity by importing new and or updated information for the entity from the structured metadata.

* * * * *